United States Patent
Lloyd

(10) Patent No.: US 7,313,648 B2
(45) Date of Patent: Dec. 25, 2007

(54) CORRUPTION TOLERANT METHOD AND SYSTEM FOR DEPLOYING AND MODIFYING DATA IN FLASH MEMORY

(75) Inventor: Robert F. Lloyd, Muskego, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 487 days.

(21) Appl. No.: 10/955,357

(22) Filed: Sep. 30, 2004

(65) Prior Publication Data

US 2006/0069847 A1    Mar. 30, 2006

(51) Int. Cl.
*G06F 7/22* (2006.01)
(52) U.S. Cl. .................. 711/103; 707/103 R; 714/6
(58) Field of Classification Search .......... 711/103; 707/103 R; 714/6
See application file for complete search history.

(56) References Cited

U.S. PATENT DOCUMENTS 5,548,751 A * 8/1996 Ryu et al. .................. 707/102
6,327,625 B1 * 12/2001 Wang et al. ................ 709/235

OTHER PUBLICATIONS

RFC: 793, retreived from internet Jul. 20, 2007 <http://www.faqs.org/ftp/rfc/pdf/rfc793.txt.pdf>, Sep. 1981, pp. 15-17.*

* cited by examiner

*Primary Examiner*—Brian R. Peugh
*Assistant Examiner*—Jared I Rutz
(74) *Attorney, Agent, or Firm*—Patrick S. Yoder; Alexander R. Kuszewski

(57) ABSTRACT

In accordance with embodiments of the present techniques, a method and system are disclosed for storing write data in electronic memory. The system and method may comprise traversing a contiguous data chain beginning at a target position. The contiguous data chain may be adapted for population with data disposed in data structures comprising a plurality of headers and data elements. Length and lengthnot member values in a header may be checked to determine whether they are in an erased condition. The data structures may be selected if the length and lengthnot members are each in the erased condition. A value may be written to the length member based on an amount of memory required to store the write data in the data element such that the length value corresponds to an allotment of memory for the write data. The write data may be written to the data element within the allotment of memory. Further, upon completion, a value adapted for confirming completion may be written to a signature member in the header.

26 Claims, 5 Drawing Sheets

CORRUPTION TOLERANT METHOD AND SYSTEM FOR DEPLOYING AND
MODIFYING DATA IN FLASH MEMORY

BACKGROUND

The present invention relates to electronic data storage and electronic data storage devices. More particularly, the present invention relates to a system and method of storing write data in electronic memory (e.g., flash memory).

Electronic memory may be defined as the working space used by a computer to hold programs and data. One type of electronic memory is physical memory (e.g., data storage that comes in the form of chips). Generally, electronic memory may be thought of as an array of boxes, each of which is capable of holding a single byte of information. This type of memory may come in the form of an electronic device capable of storing information as binary data. The number of bytes referring to memory reflects the number of very low level logical states that can be stored in a memory device.

Electronic memory comes in a variety of forms and may serve a number of purposes. For example, flash memory is a type of electronic memory that may be used to facilitate fast information storage in computer devices (e.g., digital cameras, video game consoles, and personal computers). Computer BIOS chips, memory sticks, PCMCIA cards, and so forth are examples of flash memory devices. In operation, flash memory devices generally perform more as hard drives than as RAM. In fact, flash memory devices may be considered solid state (i.e., electronic instead of mechanical or magnetic) storage devices. Further, flash memory devices are typically considered reliable, cost-effective devices for programmable, nonvolatile data storage. Indeed, once programmed, flash memory devices tend to be extremely reliable and are generally nonvolatile (i.e., do not require power to retain their programmed states and will not necessarily have data loss upon loss of power).

A flash memory device can be erased by moving electrons disposed in cells of the flash memory device such that the cells are returned to a normal state (e.g., having a value of 1 instead of 0). This may be achieved by the application of an electric field. For example, a flash memory chip may be erased by the application of an electric field to the entire chip or to a section of the chip. Because flash memory devices can be erased entirely or in sections, it may be faster to erase flash memory than to erase the memory of traditional memory devices. Indeed, the entire memory or predetermined sections of the memory (i.e., blocks or sectors) in a flash memory device may be erased at one time, as opposed to erasing or overwriting one byte at a time in other types of memory devices. This is typically done in flash memory devices using in-circuit wiring to apply an electric field either to the entire chip or to a particular sector. However, while a flash memory device may be erased faster than traditional memory devices, it should be noted that it is still inherently slow to erase and write. Indeed, even a single erase/write cycle can noticeably degrade a system's performance.

Once a flash memory chip or sector has been erased, it can be rewritten. Because flash memory devices are either entirely erased or erased in large blocks (e.g., sectors), when data is being modified on a flash memory device, the data is often transferred during modification. For example, data from the flash memory device is usually transferred to RAM, the flash memory is erased, the data is modified, and then the modified data is written from RAM to the flash memory device. While flash memory devices are generally reliable once programmed, data may be corrupted during such a process. What is needed is an improved electronic memory device that is more reliable, robust, and flexible.

BRIEF DESCRIPTION

Embodiments of the present techniques relate to a system and method of storing write data in electronic memory (e.g., flash memory). Exemplary features of the invention are described in this section. Additional and alternative features and embodiments will be discussed in further detail below.

Some embodiments of the present techniques relate to traversing a contiguous data chain adapted for population with data beginning at a target position. The data in the data chain may be disposed in a plurality of data structures that combine to form the data chain. Each of the plurality of data structures may comprise a plurality of headers and a plurality of data elements. Some embodiments of the present techniques comprise steps and modules for checking length and lengthnot member values in a header to determine whether both members are in an erased condition. The header in such embodiments corresponds to one of the data structures in the data chain. This data structure may be selected for storing write data if the length and lengthnot members are each in the erased condition. A length value may be written to the length member of the header. This length value, in accordance with present techniques, may be based on an amount of memory required to store the write data in the data element such that the length value corresponds to an allotment of memory for the write data. Further, some embodiments of the present techniques comprise steps and modules for writing the write data to the data element within the allotment of memory. Upon completion of writing the write data to the data element, a signature value may be written to a signature member in the header, the signature adapted for confirming completion of the write process.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present invention relate generally to the field of electronic memory, such as flash memory devices. It should be noted, however that the invention is not intended to be limited to this or any particular electronic memory device. More particularly, embodiments of the present invention relate to techniques for regulating data storage to provide corruption tolerant electronic memory. A corruption tolerant electronic memory device in accordance with the present techniques may limit exposure to data corruption resulting from a system reset or power failure. Additionally, such memory devices may be described as robust because they perform reliably even when a portion of stored data has been corrupted by a reset or power failure.

Figure 1:
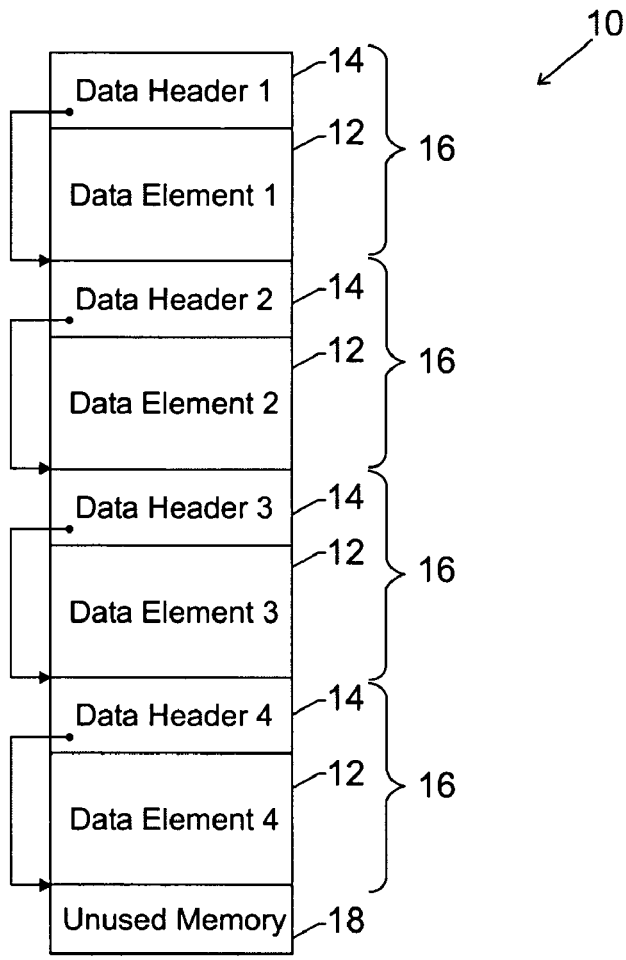
FIG. 1 is a block diagram illustrating a contiguous chain of data elements and related header structures in accordance with embodiments of the present invention.

FIG. 1 is a block diagram illustrating a contiguous chain 10 of data elements 12 and related header structures 14 in accordance with embodiments of the present invention. Each data element 12 and corresponding header 14 may cumulatively be referred to as a data structure 16 in the present context. The chain 10 may be a platform for the population by and organization of data structures 16. Embodiments of the present techniques may utilize such a contiguous chain 10 of data structures 16 to provide improved electronic memory devices that are more reliable, robust, and flexible. Indeed, embodiments of the present techniques may address potential reliability problems that exist with common memory devices (e.g., flash memory chips). For example, while flash memory devices are typically reliable once programmed, it is now recognized that corruption may occur during programming cycles for the devices. Indeed, there may be a risk of producing corrupted data in a flash memory device when a programming cycle for the device is interrupted. A reset or power failure occurring during a write or erase cycle (e.g., after data from the device has been transferred to RAM and the flash memory has been erased) may expose a window wherein all data relating to the flash memory device could be lost or made unreliable.

Additionally, it is now recognized that repeated erasing and reprogramming of a flash memory device may result in device degradation. In other words, there may be a limitation on the number of times a flash memory device can be erased and reprogrammed and still remain functional. Conventional approaches generally involve erasing and reprogramming the entire device each time data in the device is changed. In particular, a device that has been corrupted may require such erasure and reprogramming. While a typical flash memory device may be capable of withstanding a large number of such program/erase cycles, the number is generally considered to be finite. Accordingly, as mentioned above, it is now recognized that a significant quantity of erase/write cycles can shorten the life span of a flash memory device. Over time, flash memory devices may degrade and data stored on such devices may become unreliable. Accordingly, embodiments of the present invention reduce the need to erase and reprogram flash memory devices.

FIG. 1 illustrates an embodiment in accordance with the present techniques that addresses issues relating to lost and unreliable data in electronic memory devices. Specifically, FIG. 1 shows the data elements 12, the related headers 14, and unused memory 18 arranged in the contiguous chain 10, the arrangement of which may be utilized in accordance with present techniques to improve data storage. Indeed, FIG. 1 illustrates utilization of a well defined sequence to write out the data for each element 12 and related header 14.

Such a sequence may then be used to break the writing of data into well defined phases, which can be used to avoid unreliable data. For example, a write process, wherein data is being transferred to an electronic memory device, may be interrupted (e.g., by a reset or power cycle) and a portion of data in chain 10 may be corrupted, thus creating unreliable data. Embodiments of the present techniques may detect a general location of such corrupt data and continue to utilize the electronic memory device while avoiding the corrupt data. Similarly, in some embodiments of the present techniques, the corrupt data may be eliminated without potentially corrupting any additional data. By having a well defined sequence in accordance with embodiments of the present techniques, it may be possible to determine what phase of the write process was interrupted and to consistently skip over the unreliable data. It should be noted that in some embodiments of the present techniques, utilization of a well defined sequence may be eliminated because such use would be ineffectual.

Figure 2:
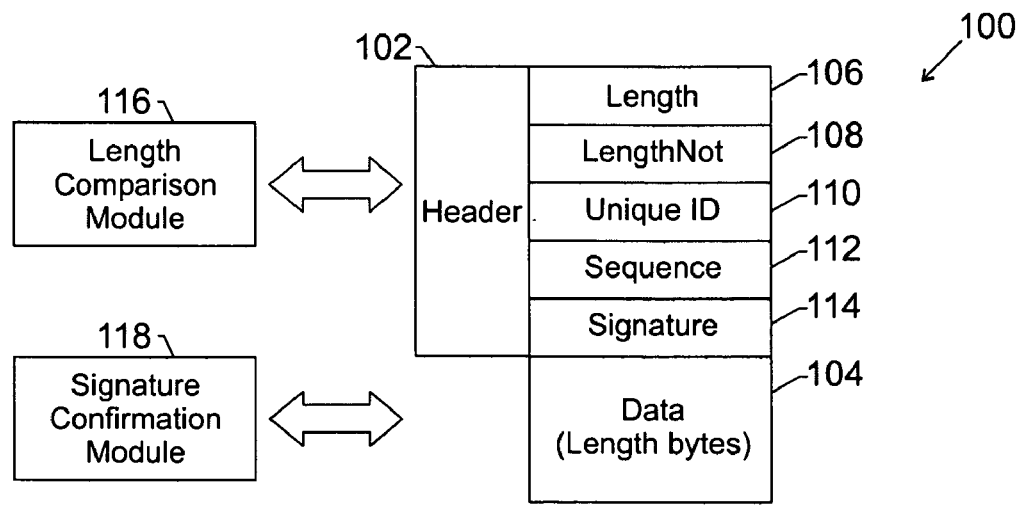
FIG. 2 is a block diagram illustrating a component view of a data structure and its relationship to a length comparison module and a signature confirmation module in accordance with embodiments of the present invention.

FIG. 2 is a block diagram illustrating a component view of a data structure and its relationship to analysis modules in accordance with embodiments of the present invention. The data structure is illustrated as having a header (or header structure) and data element in accordance with embodiments of the present techniques. The data structure may be generally referred to by reference numeral 100. Specifically, FIG. 2 provides a detailed view of members of a header structure 102 in relation to a corresponding data element 104 in accordance with embodiments of the present techniques. As shown in the illustrated embodiment, the header structure 102 is made up of various members, including: a length member 106, a lengthnot member 108, a uniqueID member 110, a sequence member 112, and a signature member 114. FIG. 2 also specifically illustrates interaction between the data structure 100 and a length comparison module 116 and a signature confirmation module 118. These header members, analysis modules and their corresponding functions will be discussed more fully below.

The data structure 100 may represent one of the data structures 16 in chain 10. Such a data structure 100 may comprise data that consumes a quantifiable amount of storage space (e.g., bytes of memory) in an electronic memory device (e.g., flash memory). Indeed, the header 102 and data element 104 may each require certain amounts of storage space (e.g., number of bytes) in such a memory device. For example, every data element 12 in the chain 10 may require a different amount of storage space to perform its assigned function (e.g., configure a computer monitor as a color monitor). The required storage space for each such data element 12 may be dependent upon the particular function the data element 12 is assigned. In contrast, each header 14 may require a uniform amount of storage space. This set allotment of storage space for each header 14 may reflect the amount required to store data that identifies certain predefined features relating to the corresponding data element 12 (e.g., a reference number identifying a particular function). Accordingly, the variable number of required bytes of electronic memory for each data element 12 (excluding the bytes allotted for the corresponding header 14) may be represented by a value that is stored as a member of the corresponding header 14, in storage space allotted for the header 14.

The first and second members of the illustrated header structure 102 are length 106 and lengthnot 108 members. These two members 106 and 108 may combine to provide a redundant mechanism for defining the number of bytes required and consumed by the data element 104. For example, the length member 106 may define a quantity or length in bytes of user data to be stored in data element 104 using a 32-bit number (e.g., 10000011 01101011 00010000 11001000). Thus, the length member 106 may define the size of data element 104. The lengthnot member 108 may complement the length member 106 using a logical negation (i.e., 0 becomes a 1 and a 1 becomes a 0) of the 32-bit number, thus redundantly defining the size of the data element 104. While in some embodiments of the present techniques the length member 106 is confirmed with various different methods (e.g., a duplicate 32-bit number), the lengthnot member 108 facilitates confirmation of data element size because the logical sum of the length member 106 and the lengthnot member 108 is zero. It should be noted that in some embodiments of the present techniques, a two's complement (i.e., a method of signifying negative numbers in binary), electronic signature, or other verification method may be used to establish a valid data length. A length comparison module may be utilized in an electronic memory device to make determinations regarding the length and lengthnot values.

The uniqueID member 110 may be used in accordance with embodiments of the present techniques to identify the contents of the data element 100 and to facilitate efficient operation. Indeed, the uniqueID member 110 may be used to identify the data type, data status, and/or the function of the data stored in data element 104. For example, a uniqueID value of "55" may correspond to configuration data in data element 104 that establishes whether a monitor is a color display or a monochrome display. During configuration of the monitor, the data associated with the uniqueID value of "55" may be sought out to establish the display capabilities of the monitor. Alternatively, if an error is occurring with a system device, a search can be performed for the relevant uniqueID member values, enabling identification of the problem area. Accordingly, the uniqueID member 110 facilitates the location of functional data, unreliable data, and so forth. It should further be noted that embodiments of the present techniques may facilitate not only the identification of unreliable data but reconfiguration of the data because data locations can be detected and updated.

The sequence member 112 may be used in conjunction with the uniqueID member 110 to distinguish between data elements having the same uniqueID values within a chain (e.g., chain 10). The sequence member 112 may comprise a monotonically increasing number used to provide an ordering of various elements. In some embodiments of the present techniques, the sequence member 112 is a value that increases each time a given uniqueID member value is written. The sequence member 112 may be used to distinguish multiple copies of a given uniqueID 110. A data structure 100 having duplicate uniqueID member values may distinguish between the two values based on the associated sequence members values. The uniqueID 110 with the associated sequence member 112 having a higher value may represent a more recent data element 104. For example, a monitor may have an electronic memory device comprising a chain of data structures and a plurality of data structures in the chain having a heading with identical uniqueID member values (e.g., values representing the same configuration function).

Initially, the configuration data stored in a data element 104 may establish the monitor as a monochrome display but a second data element may be added to the chain that establishes the monitor as a color display. Because the second data element will have a higher sequence number, embodiments of the present techniques will bypass the initial data element and the monitor will be configured as a color display. Alternatively, in accordance with embodiments of the present techniques, rather than maintaining sequence numbers for each uniqueID, a globally increasing sequence number may be maintained.

It is desirable in accordance with some embodiments of the present invention to confirm that a write process has completed successfully. The signature member 114 may perform this function. Specifically, the signature member 114 may comprise a predefined value that signals a complete write. In other words, the signature member 114 may be used in accordance with embodiments of the present techniques to signal that the entire data element 100 has been successfully written. In some embodiments of the present techniques, the signature member 114 may comprise any value that is not an erase value (i.e., a value designating that the storage space is empty). For example, the signature member 114 may comprise a copy of the value designating the length member 106. Alternatively, the signature member 114 may merely comprise a predefined constant value. It should be noted that in some embodiments of the present invention, a two's complement, electronic signature, or other verification method may be used to establish a completed write event. A signature validation module may be utilized in an electronic memory device to confirm a successful write.

The illustrated length comparison module 116 and signature confirmation module 118 are analysis modules in accordance with embodiments of the present techniques. These analysis modules may include executable instructions, code, or software elements adapted to cooperate with the data structure 100 in order to make determinations regarding the content of the data structure 100. Further, such analysis modules may be integral to a memory device or operable from an external application. Specifically, in accordance with the present techniques, the length comparison module is adapted to compare the length 106 and lengthnot 108 values to determine whether a storage area defining the data element 104 was properly allotted based on the size of corresponding write data. The signature confirmation module 118 is adapted to validate a signature value and to determine whether write data in the data element 104 has been corrupted, in accordance with embodiments of the present techniques.

Figure 3:
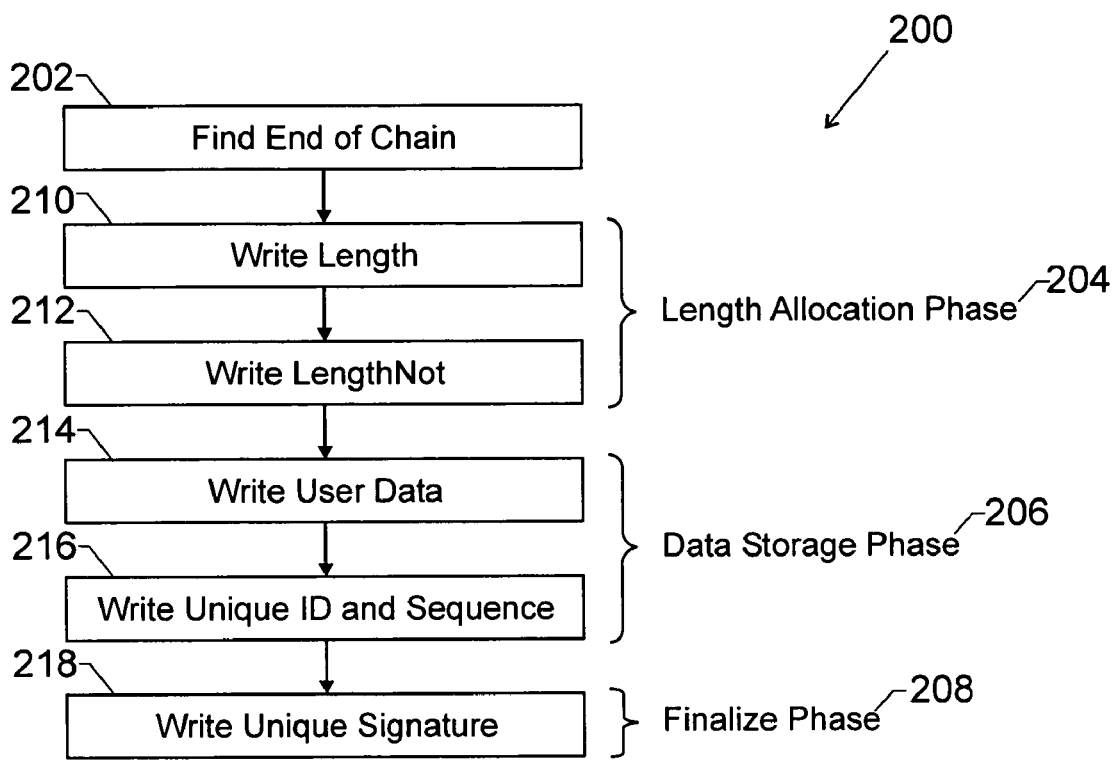
FIG. 3 is a block diagram illustrating an algorithm used to write out data associated with a data structure in accordance with embodiments of the present invention.

FIG. 3 is a block diagram illustrating an algorithm used to write out data associated with a data structure in accordance with embodiments of the present invention. The algorithm may be generally referred to by reference number 200 and the data being written to the data element may be referred to as "write data." In accordance with embodiments of the present techniques, the algorithm 200 may be based on an assumption that a block of memory to which data is being written is contiguous and is initially in an erased state. Accordingly, the first block in the illustrated algorithm 200 represents finding an end of a contiguous chain of data elements (block 202). The remaining blocks of the algorithm 200 can be defined by the following three write phases: a length allocation phase 204, a data storage phase 206, and a finalize phase 208. Theses phases may represent, for example, writing data to both header structures 14 and data elements 12, which are illustrated in FIG. 1. It should be noted that in accordance with some embodiments of the present techniques, header and data checksums may be incorporated to protect against data corruption after writing.

In accordance with embodiments of the present techniques, the first write phase in algorithm 200 is the length allocation phase 204. In this phase, a certain number of bytes of flash memory may be allocated for data storage. Such an allocation may be represented by two operations in accordance with embodiments of the present techniques. Specifically, these two operations may comprise writing to a length member and writing to a lengthnot member as illustrated in blocks 210 and 212, respectively. Block 210 may represent writing the length of write data designated for data element 12 (excluding data for the corresponding header 14) into a length member. Similarly, block 212 may represent writing the logical complement of the length of such write data into the lengthnot member. At the completion of the length allocation phase 204, a defined amount of memory may have been committed for use by the write data in accordance with embodiments of the present techniques. Accordingly, if the write data is corrupted, the allotted length of storage space may be passed over to avoid such corrupt data.

The second and third write phases in algorithm 200 may be the data storage phase 206 and finalize phase 208, respectively. In accordance with embodiments of the present techniques, the data storage phase 206 may comprise actually writing data to the data element. Indeed, in some embodiments of the present techniques, this phase comprises two operations as illustrated by blocks 214 and 216. Block 214 in the data storage phase 206 may represent writing out the user data to the data element. Block 216 may represent writing out the uniqueID and sequence member values to the header structure 14 of the data element 12. Finally, once the data is completely written, the finalize phase 208 may be entered wherein, the signature member value may stored (block 218), confirming that the write was completed successfully.

Figure 4:
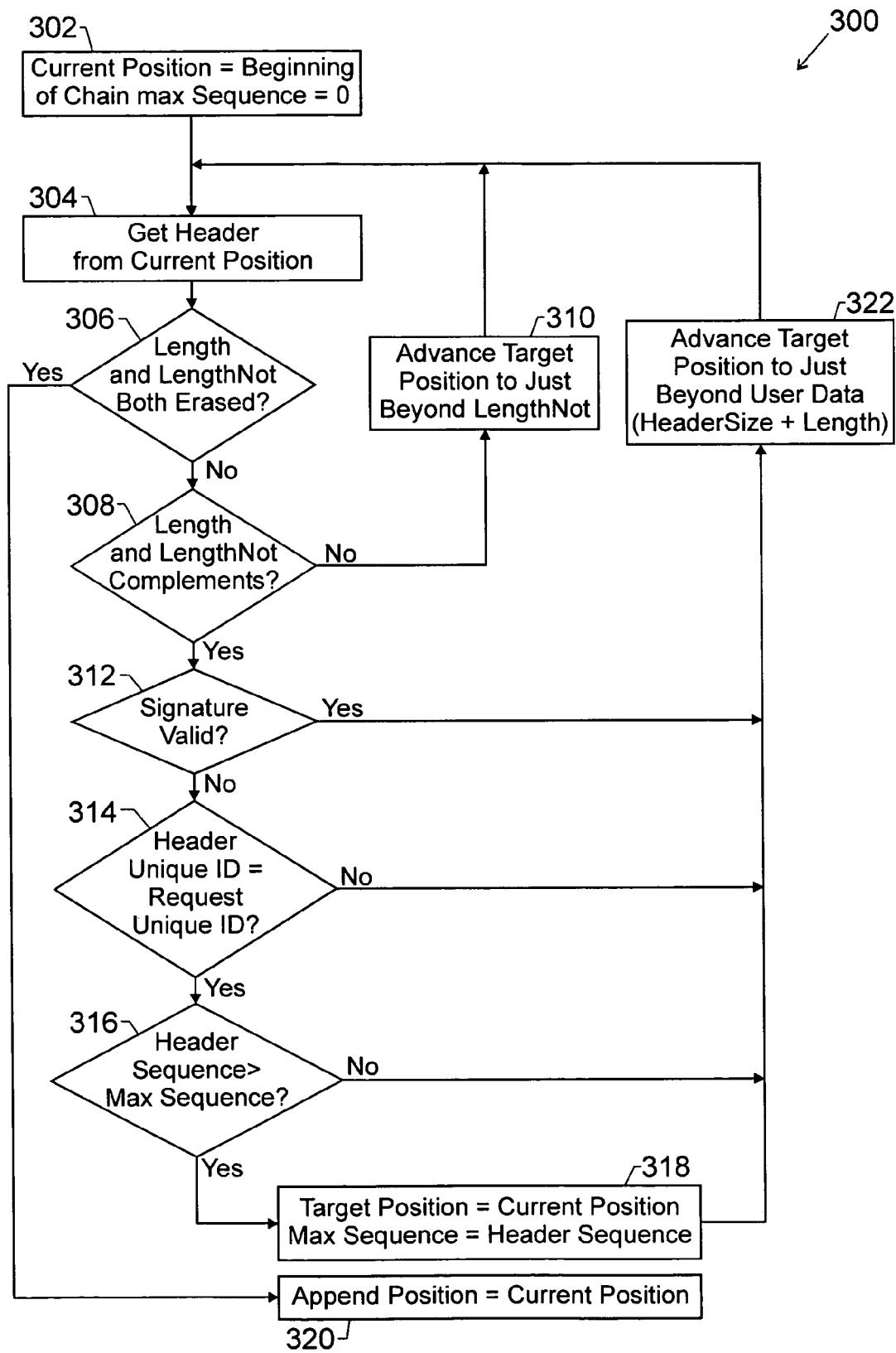
FIG. 4 is a block diagram representing an algorithm for reading a data element and making determinations relating to a write process for the data element in accordance with embodiments of the present invention.

FIG. 4 is a block diagram representing an algorithm for reading a data element and making determinations relating to a write process for the data element in accordance with embodiments of the present invention. The algorithm illustrated in FIG. 4 may generally be referred to by reference numeral 300. FIG. 4 may demonstrate how data elements are read and how determinations can be made as to whether a write process for a particular data element was properly completed. Additionally, if the write process failed, FIG. 4 may demonstrate how a determination can be made regarding the phase of the write process in which the failure occurred. Restated, algorithm 300 may give a failsafe set of rules for locating a next item in a chain of data elements that works reliably not matter if or when a write operation is interrupted. Specifically, algorithm 300 may comprise a plurality of operations as illustrated by blocks 302, 304, 306, 308, 310, 312, 314, 316, 318, 320, and 322.

Block 302 may represent determining the beginning position of a contiguous chain of data elements in a memory sector of an electronic memory device. For example, in accordance with embodiments of the present invention, block 302 may represent a determination that a current position is the beginning of the contiguous chain of data elements because a maximum sequence member value is zero. Block 304 may represent retrieving a header relating to the current position, whether the current position is the beginning position of the contiguous chain of data elements or some position within the chain. The header being retrieved may comprise a length member, a lengthnot member, a signature member, and a uniqueID member, as discussed above and illustrated in FIG. 2.

Block 306 may represent checking the length and lengthnot members to determine whether they both comprise erased values (i.e., blank). If both members are blank, an assumption may be made that the current position is the end of the memory sector (where new data elements can be written). Accordingly, the algorithm 300 may proceed to block 320, wherein an append position is defined as the current position. If length and lengthnot members are not both blank, then a determination as to whether they complement each other may be made in block 308.

If the length and lenghtnot member values do not complement each other, it may be taken as an indication that a write to the corresponding memory sector was interrupted during the length allocation phase 204. In accordance with some embodiments of the present invention the length allocation phase 204 is the first phase of a plurality of phases. Accordingly, an interruption in the length allocation phase 204 may indicate that no data beyond the length member and lengthnot member was written. Therefore, in searching for a next data item, the length and lengthnot member pair may be skipped over and the aborted operation may only cost eight bytes of data (assuming 32-bit length values). Accordingly, the algorithm 300 may proceed to block 310, which advances a target position just beyond the space consumed by lengthnot. In some variations in accordance with embodiments of the present techniques, an entire header may be skipped rather than eight bytes when an incomplete length allocation phase 204 is discovered.

If the length and lengthnot member pair did pass the complement test, an assumption may be made that the length allocation phase 204 was completed and algorithm 300 may proceed to block 312. Block 312 may represent checking the signature member to determine its validity. If the determination in block 312 is a conclusion that the signature member is valid, an assumption may be made that the finalize phase 208 was completed and that the data integrity is sound. However, if the signature member is not validated in block 312, an assumption may be made that a reset occurred during the data storage phase 206 or the finalize phase 208. In either case, the data integrity may be suspect and the data may be ignored. Accordingly, as illustrated by block 324, a target position may be advanced past the memory space allocated for the data element, thus avoiding the entire related data structure. However, in accordance with embodiments of the present techniques, because the length allocation phase 204 was successfully completed, a search for the next data item may proceed beyond the header and an assumption may be made that the chain of data elements is intact.

FIG. 4 may also illustrate how a new data element can be added to the chain of data elements in accordance with embodiments of the present invention. For example, a new data element may be added to the chain of data elements by simply traversing the chain of data elements using the algorithm 300 in FIG. 4 until a blank length and lengthnot member pair is found. As the chain is traversed in search of the blank length and lengthnot member pair, the highest sequence member value along the way may be recorded. In accordance with embodiments of the present invention, the new data element may then be appended to the end of the chain of data elements using, for example, algorithm 200.

Blocks 314 and 316 in combination with other operations in algorithm 300 may illustrate how a current data item having a particular uniqueID can be found. For example, in searching for such a data element, the chain of data may be traversed using algorithm 300. For each valid element found while traversing the chain of data, verification as to whether the corresponding uniqueID member matches a requested data type may be made in block 314. For example, if the uniqueID corresponding to a particular data element does not match the requested uniqueID, algorithm 300 may proceed to Block 324, which represents advancing a target position to just beyond the associated user data (header size and length). If a match is found, a determination may be made in block 316 as to whether the corresponding sequence member has the highest value found. If not, the algorithm may proceed to block 322. Alternatively, the algorithm may proceed to block 318, which represents a determination that the target position is the current position and that the maximum sequence member value is the current header sequence value. In accordance with embodiments of the present techniques, this data may be marked or designated, but will not be accepted as the most recent data until the entire chain of data has been traversed.

It should be noted that the scheme illustrated by algorithm 300 may allow multiple copies of a given data element to exist in the chain of data elements. Accordingly, it may not be necessary to erase the electronic memory to replace a data element. Successfully appending a data element to the end of the chain of data elements essentially overrides any previous occurrences of that data element. Further, any failed write of the data element will be skipped as if it did not exist in accordance with embodiments of the present invention. It should also be noted that embodiments of the present invention allow the chain of data elements to be traversed without needing to ever read the user data. Accordingly, embodiments of the present invention allow much faster access to a given data element than schemes that rely on data checksums to establish data integrity.

Figure 5:
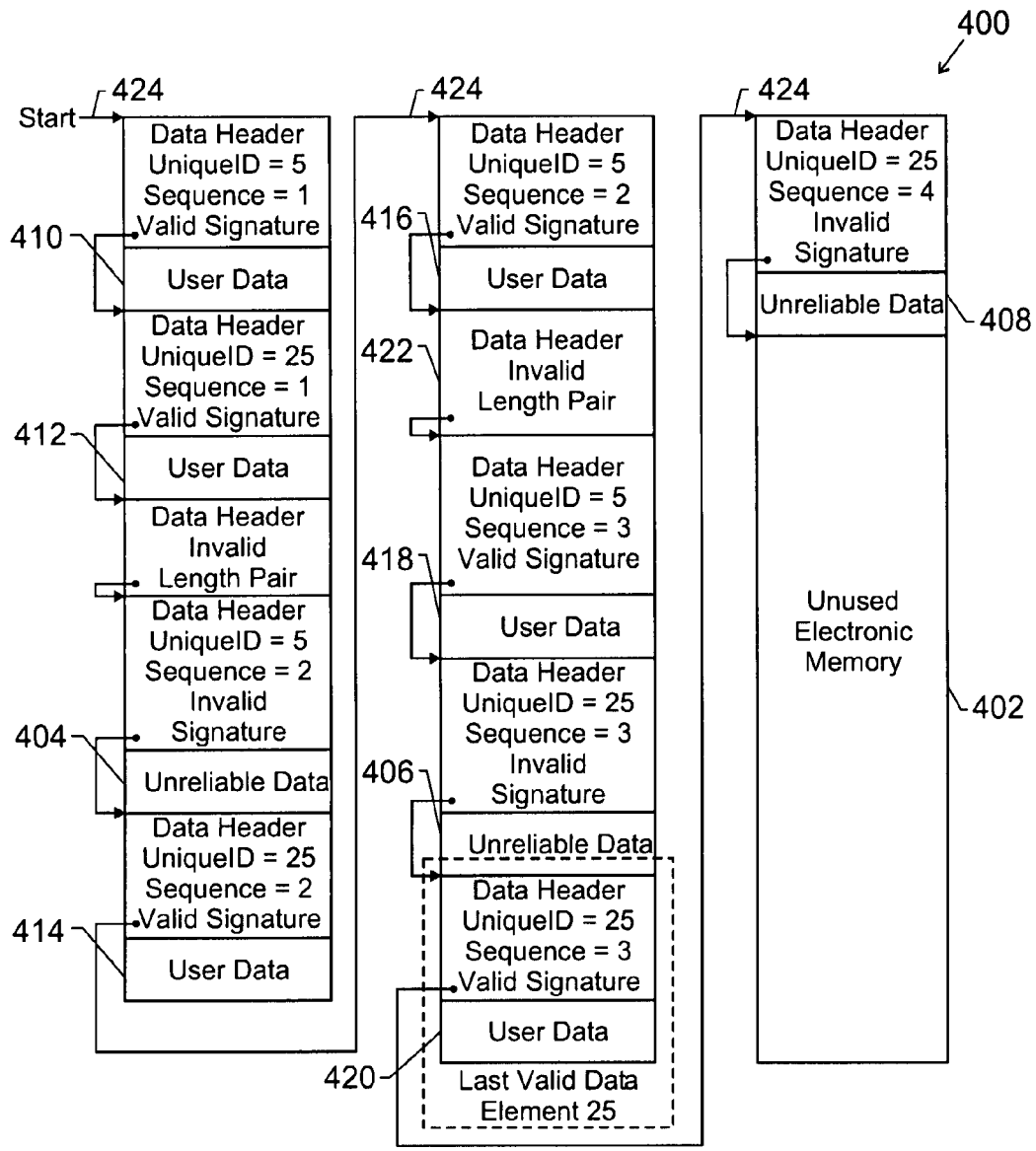
FIG. 5 is a block diagram illustrating an exemplary chain of data elements and unused memory in accordance with embodiments of the present invention.

FIG. 5 is a block diagram illustrating an exemplary chain of data elements and unused memory in accordance with embodiments of the present invention. This exemplary chain of data elements may generally be referred to as chain 400 and the unused flash memory may be referred to by reference number 402. As illustrated, chain 400 comprises corrupt data 404, 406, and 408 and valid data 410, 412, 414, 416, 418, and 420. Block 422 represents an invalid data header resulting from a pre-allocation of data error (e.g., a length member value allocation failure). Accordingly, block 422 does not have an associated data element. Additionally, FIG. 5 illustrates a search path 424 that an algorithm may trace in finding a latest valid data element 420 with an associated uniqueID member value of "25." It should be noted that finding this latest valid data element 420 may be achieved in accordance with embodiments of the present techniques regardless of corrupted elements 404, 406, 408, and 422 in the chain 400.

In accordance with embodiments of the present techniques, searches, such as the one illustrated by search path 424, may assess features of the sequence member of each data element. These assessments may be used to make a determination regarding the latest valid data element with an associated uniqueID member. For example, in accordance with FIG. 5, such assessments may be made in determining that data element 420 is the latest valid data element with an associated uniqueID member with a value of 25. Assessing sequence member values may be better than merely assuming that the last element in the chain 400 is the most recent because of electronic memory capacity limitations. For example, flash memory does not have infinite capacity and thus eventually it may be necessary to erase data in the flash memory. When an element is being appended to a chain of data in flash memory, there may not be enough available storage space in the flash memory to hold the new data. Accordingly, it may be necessary to erase a sector of the flash memory. Specifically, in accordance with embodiments of the present techniques the sector holding the related chain of data may be erased and the data written as the start of a new chain. This may result in erasure of all other data elements in the chain, opening a window for the entire chain to be lost. For example, the entire chain may be lost in the event of a reset.

One means of preventing the loss of a chain in accordance with embodiments of the present invention may be to implement a cleanup algorithm. A cleanup algorithm may read all of the most recent (the latest) data elements into RAM before the erasure. After erasure, all of the most recent data elements may be written to the flash memory along with the newly added element. This solution may be appropriate when the need to erase flash memory has a low probability and a reasonable default recovery set exists for the rare occurrence of data loss (if the system is not crippled by the data loss). For example, this may be a desirable solution if related data elements contain configuration data that is rarely changed and that is unlikely to ever overflow the allotted electronic memory for the lifetime of the product. Further, this may be a desirable solution if workable defaults exist to replace any lost configuration data.

Figure 6:
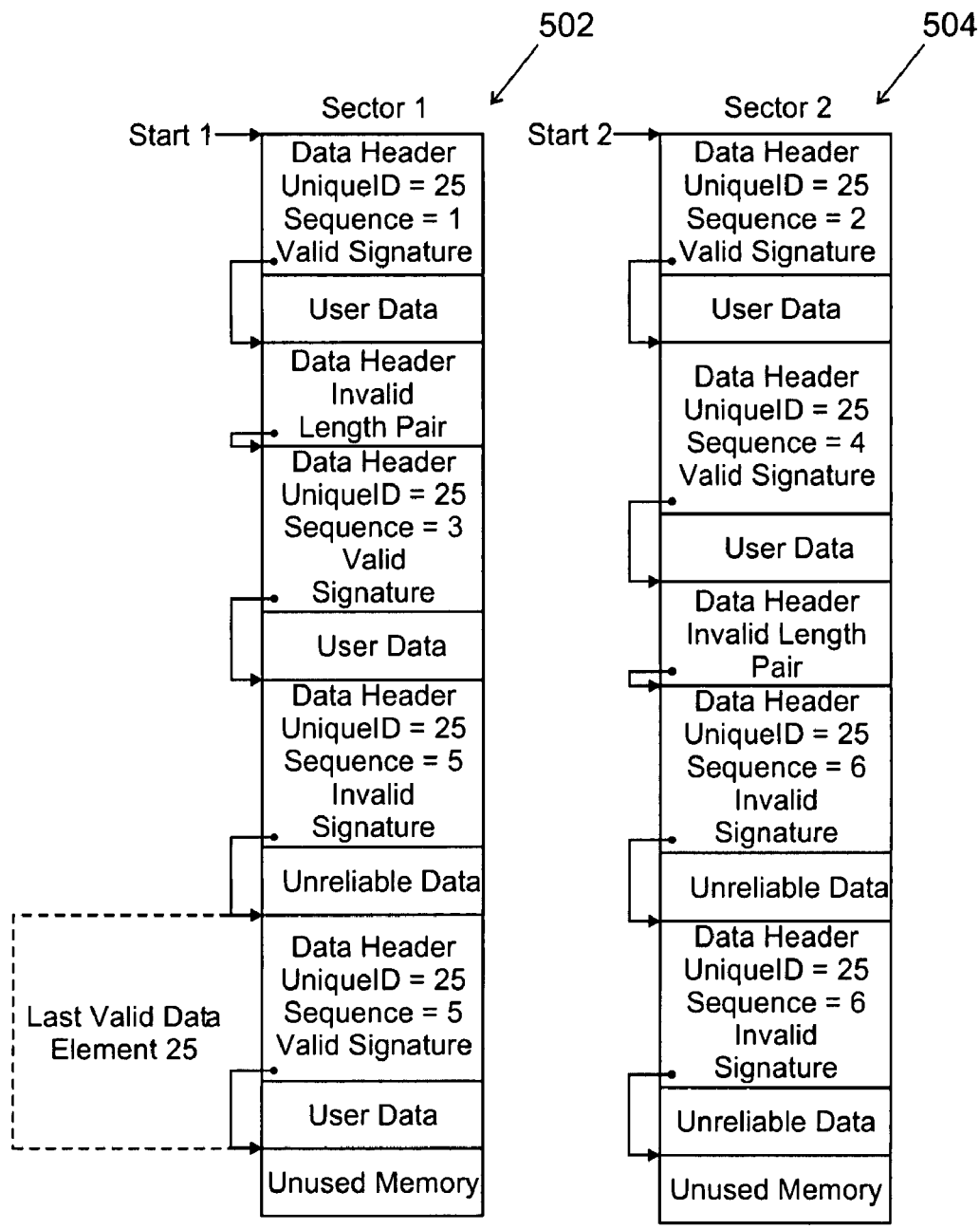
FIG. 6 is a block diagram illustrating two sectors of an electronic memory device in accordance with embodiments of the present invention.

FIG. 6 is a block diagram illustrating two sectors of an electronic memory device in accordance with embodiments of the present invention. It may be desirable to have multiple chains to provide redundancy, for example, in accordance with embodiments of the present techniques. The first sector may be generally referred to by reference numeral 502 and the second sector may be generally referred to by reference numeral 504. To create a truly failsafe system in accordance with embodiments of the present techniques, it may be necessary to have at least two independently erasable sectors of flash memory (e.g., 502 and 504), each with its own chain of data elements. In accordance with embodiments of the present techniques, an initial data write may occur in both chains 502 and 504, with subsequent writes alternating between the two sectors. To find the latest data element of a given uniqueID member value, both chains are traversed as illustrated by search paths 506 and 508. The maximum uniqueID member value, as determined in traversal of the two chains 502 and 504, may establish an absolute order of rights and determine which data element is the most recent. New data elements are appended to the other sector. Accordingly, if a sector is in the process of being erased and a system interruption occurs, the sector having the most recent value is still intact. It should be noted that embodiments of the present techniques are completely failsafe if only one uniqueID is stored. The unique ID member may be eliminated if only one type of data element is ever stored in the chain of data elements. To be completely failsafe in systems with multiple types of data elements (e.g., different uniqueIDs), each data element may be written to both sectors every time.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of storing write data in electronic memory, comprising:

traversing a contiguous data chain beginning at a target position, the contiguous data chain adapted for population with data, the data being disposed in a plurality of data structures adapted for forming the data chain, the plurality of data structures comprising a plurality of headers and a plurality of data elements;

checking a length member in a one of the plurality of headers and a lengthnot member in the one of the plurality of headers, the length and lengthnot members adapted to hold complimentary values, to determine whether both members are in an erased condition, the one of the plurality of headers corresponding to one of the plurality of data structures;

selecting the one of the plurality of data structures for storing the write data based upon the length member and lengthnot member in the one of the plurality of headers each being in the erased condition;

writing a length value to the length member based on an amount of memory required to store the write data in the data element of the selected data structure such that the length value corresponds to an allotment of memory for the write data;

writing the write data to the data element of the selected data structure within the allotment of memory; and confirming completion of writing the write data.

2. The method of claim 1, comprising writing a lengthnot value to the lengthnot member, the lengthnot value being a complement to the length member value.

3. The method of claim 1, comprising writing a uniqueID value in a uniqueID member of the one of the plurality of headers, the uniqueID value identifying aspects relating to the write data.

4. The method of claim 3, wherein the uniqueID value is a number that corresponds to a function of the write data.

5. The method of claim 1, comprising writing a sequence value to a sequence member of the one of the plurality of headers, the sequence value adapted for comparison with other sequence values to provide ordering of the plurality of data structures in the contiguous data chain.

6. The method of claim 5, wherein the sequence value is a monotonically increasing number relative to a previously written sequence value.

7. The method of claim 5, wherein the sequence value corresponds to a uniqueID member and enables distinction between the uniqueID member and other uniqueID members having equivalent uniqueID values.

8. The method of claim 1, comprising writing the write data to the contiguous data chain, the contiguous data chain residing in a Flash memory device.

9. The method of claim 1, comprising allotting an amount of memory space corresponding to a size of the write data to the one of the plurality of data elements.

10. The method of claim 1, wherein upon completion of writing the write data to the data element, writing a signature value to a signature member in the header, the signature value adapted for confirming completion of writing the write data.

11. An apparatus for storing write data, comprising:
one or more electronic memory devices defining:
    a plurality of data structures adapted to hold data and adapted for forming a contiguous data chain structure, the plurality of data structures comprising a plurality of headers and a plurality of data elements;
    a length member and a lengthnot member in one of the plurality of headers, the length and lengthnot members adapted to hold complementary values representing a size of write data to be stored in one of the plurality of data elements;
    a signature member in one of the plurality of headers, the signature member adapted for storing a signature value for use in confirming completion of writing the write data;
wherein the one or more electronic memory devices have application instructions stored thereon, the application instructions comprising:
    a length comparison module, the length comparison module adapted to compare the length and lengthnot values to determine whether a storage area defining the one of the plurality of data elements was properly allotted based on the size of write data; and
    a signature confirmation module, the signature confirmation module adapted to validate the signature value and to determine whether the write data in the one of the plurality of data elements is corrupt.

12. The apparatus of claim 11, wherein the length comparison module is adapted to determine whether the length and lenghtnot values are complements.

13. The apparatus of claim 11, comprising a uniqueID member adapted to store a uniqueID value of the one of the plurality of headers, the uniqueID value identifying aspects relating to the write data.

14. The apparatus of claim 13, wherein the uniqueID member is adapted to store a number that corresponds to a function of the write data.

15. The apparatus of claim 11, comprising a sequence member, the sequence member adapted for storing a sequence value for comparison with other sequence values to provide ordering of the plurality of data structures in the contiguous data chain structure.

16. The apparatus of claim 11, wherein the contiguous data chain structure is formed in a Flash memory device.

17. The apparatus of claim 11, comprising an allotment module adapted to allot an amount of memory space corresponding to a size of the write data to the one of the plurality of data elements.

18. A computer implemented method of searching for write data in electronic memory, comprising:
    traversing a contiguous chain of data structures beginning at a target position and finding a data structure, the data structure comprising a header and a data element;
    comparing a length member value in the header with a lengthnot member value in the header, the length and lengthnot members adapted to hold complementary values, to determine whether a length allocation occurred, the length member of the header being based on an amount of memory required to store the write data in the data element;
    checking a signature member of the header to determine its validity if the length and lengthnot members confirm that the length allocation occurred;
    continuing to traverse the contiguous chain of data structures beginning at a new target position, the new target position being a location in memory relative to a position of the header based on results from comparing the length member value with the lengthnot member value, until a blank length and lengthnot member pair is found; and
    writing the data based upon finding the blank length and lengthnot member pair.

19. The method of claim 18, wherein a value of the length member corresponds to an allotted amount of memory for the write data and a size of the data element.

20. The method of claim 19, comprising continuing to traverse the contiguous chain of data structures beyond the allotted amount of memory for the write data only if the signature member is valid.

21. The method of claim 18, comprising continuing to traverse the contiguous chain of data structures beginning at the new target position, the new target position being a location in memory relative to a position of the header based on results of checking the signature member after comparing a length member value with a lengthnot value.

22. The method of claim 18, wherein the lengthnot member is a complement to the length member, and complement of the length and lengthnot members confirms that the length allocation occurred.

23. A flash memory comprising:
   an electronic memory device defining a plurality of data structures adapted to hold data and adapted for forming a contiguous data chain structure, the plurality of data structures comprising a plurality of headers and a plurality of data elements;
   a length member and a lengthnot member in one of the plurality of headers, the length and lengthnot members adapted to hold complementary values representing a size of write data to be stored in one of the plurality of data elements; and
   a signature member in the header, the signature member adapted for storing a signature value for use in confirming completion of writing the write data.

24. A flash memory comprising:
   an electronic memory device defining a plurality of data structures adapted to hold data and adapted for forming a contiguous data chain structure, the plurality of data structures comprising a plurality of headers and a plurality of data elements; and
   a length member and a lengthnot member in one of the plurality of headers, the length and lengthnot members adapted to hold complementary values representing a size of write data to be stored in one of the plurality of data elements.

25. An apparatus for storing write data in a memory device, the memory device including a plurality of data structures adapted to hold data and adapted for forming a contiguous data chain structure, the plurality of data structures comprising a plurality of headers and a plurality of data elements; a length member and a lengthnot member in one of the plurality of headers, the length and lengthnot members adapted to hold complementary values representing a size of write data to be stored in one of the plurality of data elements; and a signature member in the header, the signature member adapted for storing a signature value for use in confirming completion of writing the write data; the apparatus comprising machine readable media holding application instructions comprising:
   a length comparison module, the length comparison module adapted to compare the length and lengthnot values to determine whether a storage area defining the one of the plurality of data elements was properly allotted based on the size of write data; and
   a signature confirmation module, the signature confirmation module adapted to validate the signature value and to determine whether the write data in the one of the plurality of data elements is corrupt.

26. A machine readable medium storing write data in a memory device, the memory device including a plurality of data structures adapted to hold data and adapted for forming a contiguous data chain structure, the plurality of data structures comprising a plurality of headers and a plurality of data elements; a length member and a lengthnot member in one of the plurality of headers, the length and lengthnot members adapted to hold complementary values representing a size of write data to be stored in one of the plurality of data elements; and a signature member in the header, the signature member adapted for storing a signature value for use in confirming completion of writing the write data; the machine readable medium comprising:
   computer code adapted to compare the length and lengthnot values to determine whether a storage area defining the one of the plurality of data elements was properly allotted based on the size of write data, and to validate the signature value and to determine whether the write data in the one of the plurality of data elements is corrupt, and to write the write data based upon a length and lengthnot pair having sufficient storage area for the write data, as determined by comparing the length and lengthnot members, and the validation of the signature value.

* * * * *